(12) United States Patent
Wang et al.

(10) Patent No.: US 11,852,532 B2
(45) Date of Patent: Dec. 26, 2023

(54) ELECTRONIC DEVICE AND METHOD FOR SPECTRAL MODEL EXPLANATION

(71) Applicant: Coretronic Corporation, Hsin-Chu (TW)

(72) Inventors: Feng Wang, Hsin-Chu (TW); Yen-Chun Huang, Hsin-Chu (TW); Kui-Ting Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 236 days.

(21) Appl. No.: 17/535,691

(22) Filed: Nov. 26, 2021

(65) Prior Publication Data

US 2022/0170790 A1   Jun. 2, 2022

(30) Foreign Application Priority Data

Nov. 27, 2020  (TW) ................. 109141913

(51) Int. Cl.
*G01J 3/28* (2006.01)
*G01J 3/02* (2006.01)

(52) U.S. Cl.
CPC ..... *G01J 3/0275* (2013.01); *G01J 2003/2836* (2013.01)

(58) Field of Classification Search
CPC .... G01J 3/02; G01J 3/0275; G01J 2003/2836; G01J 3/28; G01J 3/14; G01J 3/18
See application file for complete search history.

(56) References Cited

U.S. PATENT DOCUMENTS

| 5,430,759 | A   | * | 7/1995  | Yokev   | H04B 1/7156 375/E1.033  |
| 8,261,005 | B2  | * | 9/2012  | Flynn   | G06F 11/108 711/E12.008 |
| 9,438,505 | B1  | * | 9/2016  | Zhou    | H04L 47/10              |
| 2001/0032307 | A1 | * | 10/2001 | Rohlman | G06F 9/3867 712/E9.055 |
| 2017/0160131 | A1 |   | 6/2017  | Goldring et al. | |
| 2019/0138806 | A1 |   | 5/2019  | Banerjee et al. | |

FOREIGN PATENT DOCUMENTS

| CN | 105891147 | 8/2016 |
| CN | 109190714 | 1/2019 |
| TW | I546523   | 8/2016 |
| TW | I703319   | 9/2020 |

* cited by examiner

*Primary Examiner* — Abdullahi Nur
(74) *Attorney, Agent, or Firm* — JCIPRNET (57) ABSTRACT

An electronic device and a method for spectral model explanation are provided. The method includes: obtaining first labeled spectral data; storing a plurality of pipelines, selecting a selected pipeline from the pipelines, and generating a first measurement result corresponding to the first labeled spectral data according to the selected pipeline; and determining an important wavelength range corresponding to the selected pipeline according to the first measurement result.

20 Claims, 6 Drawing Sheets

ELECTRONIC DEVICE AND METHOD FOR SPECTRAL MODEL EXPLANATION

CROSS-REFERENCE TO RELATED APPLICATION

This application claims the priority benefit of Taiwan application serial no. 109141913, filed on Nov. 27, 2020. The entirety of the above-mentioned patent application is hereby incorporated by reference herein and made a part of this specification.

BACKGROUND

Technical Field

The disclosure relates to an electronic device and a method for spectral model explanation.

Description of Related Art

A spectral signal is a combination of signals of various wavelengths. When a user uses a spectrometer to detect the spectral signal of a specific substance, usually only a signal of a specific wavelength is deemed important for the detection of the specific substance, while signals of other wavelengths are considered less relevant to this specific substance. However, the spectral model adopted by general spectrometers is not optimized for a specific wavelength range. Therefore, when identifying a specific substance, the detecting accuracy of the spectral model is not very high.

For example, compared with the far-infrared spectral signal, the absorption wavelengths of the near-infrared spectral signal corresponding to different chemical bonds often overlap with one another, affecting the interpretability of the spectral model. On the other hand, the different featured wavelength ranges of the spectral models for different substances also affect the transferability of these spectral models in different spectrometers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides an electronic device and a method for spectral model explanation which are capable of finding out the important wavelength range of a substance according to the labeled spectral data of a substance.

An electronic device for spectral model explanation of the present disclosure includes a processor, a storage medium, and a transceiver. The transceiver obtains first labeled spectral data. The storage medium stores multiple modules. The processor is coupled to the storage medium and the transceiver, and accesses and executes multiple modules. The modules include a pipeline recommendation module and an explanation module. The pipeline recommendation module stores multiple pipelines, in which the pipeline recommendation module selects a selected pipeline from the pipelines, and generates a first measurement result corresponding to the first labeled spectral data according to the selected pipeline. The explanation module determines the important wavelength range corresponding to the selected pipeline according to the first measurement result.

In an embodiment of the present disclosure, the aforementioned storage medium further stores a target wavelength range, and the explanation module instructs the pipeline recommendation module to re-select the selected pipeline in response to a difference being greater than a threshold, and the difference is between the important wavelength range and the target wavelength range.

In an embodiment of the present disclosure, the above-mentioned transceiver further obtains second labeled spectral data. And the pipeline recommendation module generates a second measurement result corresponding to the second labeled spectral data according to the selected pipeline, in which the explanation module determines the second important wavelength range corresponding to the selected pipeline according to the second measurement result, and updates the important wavelength range according to the second important wavelength range to generate the updated important wavelength range.

In an embodiment of the present disclosure, the above-mentioned updated important wavelength range is a wavelength range where the important wavelength range overlaps with the second important wavelength range.

In an embodiment of the present disclosure, the aforementioned first labeled spectral data and the second labeled spectral data respectively correspond to different spectrometers.

In an embodiment of the present disclosure, the aforementioned storage medium further stores multiple spectrometer specifications, and the modules further include spectrometer recommendation module. The spectrometer recommendation module selects the selected spectrometer specifications from the spectrometer specifications according to the updated important wavelength range, and outputs the selected spectrometer specifications through the transceiver.

In an embodiment of the present disclosure, the aforementioned first measurement result includes at least one spectral line, in which the explanation module calculates a degree of influence of the specific wavelength range on at least one spectral line, and determines that the specific wavelength range is an important wavelength range in response to the degree of influence being greater than the threshold.

In an embodiment of the present disclosure, the aforementioned degree of influence is associated with one of the following: correlation coefficient, mutual information, F-test results, analysis results of partial least squares method (PLS), analysis results of model-independent local interpretable model-agnostic explanations (LIME), or analysis results of SHapley additive explanations (SHAP).

In an embodiment of the present disclosure, the aforementioned selected pipeline includes a combination of at least one of pre-processing procedure and a machine learning model.

In an embodiment of the present disclosure, the aforementioned explanation module outputs analysis information through the transceiver, in which the analysis information is related to the selected pipeline and the important wavelength range.

The disclosure also provides a method for spectral model explanation, including: obtaining a first labeled spectral data; storing multiple pipelines, selecting a selected pipeline from the pipelines, and generating a first measurement result corresponding to the first labeled spectral data according to the selected pipeline; and determining an important wavelength range corresponding to the selected pipeline according to the first measurement result.

In an embodiment of the present disclosure, the method further includes: re-selecting the selected pipeline in response to a difference being greater than a threshold, and the difference is between the important wavelength range and the target wavelength range.

In an embodiment of the present disclosure, the method further includes: obtaining second labeled spectral data; generate a second measurement result corresponding to the second labeled spectral data according to the selected pipeline; determine a second important wavelength range corresponding to the selected pipeline according to the second measurement result; and updating the important wavelength range according to the second important wavelength range to generate the updated important wavelength range.

In an embodiment of the present disclosure, the above-mentioned updated important wavelength range is a wavelength range where the important wavelength range overlaps with the second important wavelength range.

In an embodiment of the present disclosure, the aforementioned first labeled spectral data and the second labeled spectral data respectively correspond to different spectrometers.

In an embodiment of the present disclosure, the method further includes: selecting the selected spectrometer specifications from multiple spectrometer specifications according to the updated important wavelength range, and outputting the selected spectrometer specifications.

In an embodiment of the present disclosure, the aforementioned first measurement result includes at least one spectral line, and the step of determining the important wavelength range corresponding to the selected pipeline according to the first measurement result includes: calculating a degree of influence of a specific wavelength range on at least one spectral line; and determining that the specific wavelength range is an important wavelength range in response to the degree of influence being greater than the threshold.

In an embodiment of the present disclosure, the aforementioned degree of influence is associated with one of the following: correlation coefficient, mutual information, F-test results, analysis results of partial least squares method (PLS), analysis results of model-independent local interpretable model-agnostic explanations (LIME), or analysis results of SHapley additive explanations (SHAP).

In an embodiment of the present disclosure, the aforementioned selected pipeline includes a combination of at least one pre-processing procedure, and a machine learning model.

In an embodiment of the present disclosure, the above method further includes: outputting analysis information, in which the analysis information is related to the selected pipeline and the important wavelength range.

Based on the above, the present disclosure obtains corresponding analysis information based on the labeled spectral data of a specific substance, where the analysis information indicates the spectral model (or pipeline) suitable for the specific substance and the important wavelength range of the specific substance.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
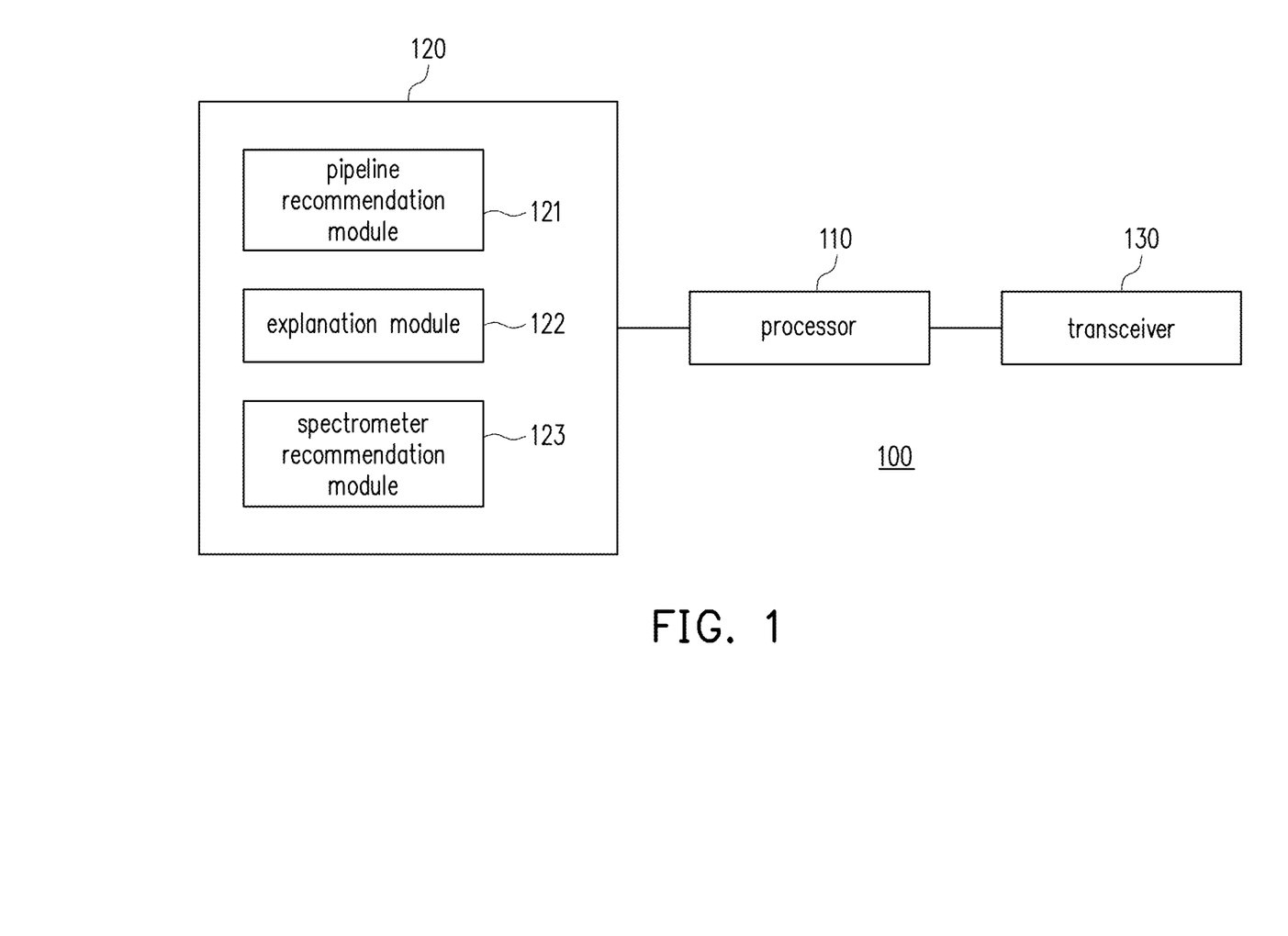
FIG. 1 is a schematic view of an electronic device for spectral model explanation according to an embodiment of the disclosure.

FIG. 1 is a schematic view of an electronic device for spectral model explanation according to an embodiment of the disclosure. An electronic device 100 includes a processor 110, a storage medium 120, and a transceiver 130.

The processor 110 is, for example, a central processing unit (CPU), or other programmable general-purpose or special-purpose micro control unit (MCU), a microprocessor, or a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), other similar components, or a combination of the above elements. The processor 110 may be coupled to the storage medium 120 and the transceiver 130, and accesses and executes multiple modules and various application programs stored in the storage medium 120.

The storage medium 120 is, for example, any type of fixed or removable random access memory (RAM), read-only memory (ROM), flash memory, hard disk drive (HDD), solid state drive (SSD), or other similar components, or a combination of the above components, which are adapted to store multiple modules or various application programs that can be executed by the processor 110. In this embodiment, the storage medium 120 stores multiple modules, including a pipeline recommendation module 121, an explanation module 122, and a spectrometer recommendation module 123, whose functions are described later.

The transceiver 130 transmits and receives signals in a wireless or wired manner. The transceiver 130 may also perform operations such as low-noise amplification, impedance matching, frequency mixing, frequency upward or downward conversion, filtering, amplification, and the like.

Figure 2:
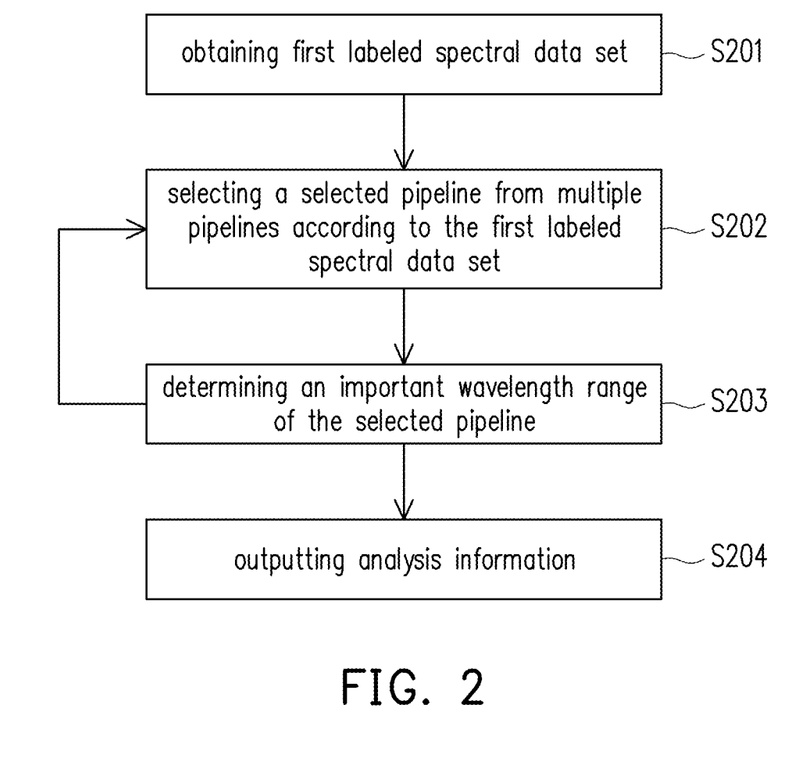
FIG. 2 is a flowchart of a method for spectral model explanation according to an embodiment of the present disclosure.

FIG. 2 is a flowchart of a method for spectral model explanation according to an embodiment of the present disclosure, and the method may be implemented through the electronic device 100 of FIG. 1.

In step S201, the electronic device 100 obtains first labeled spectral data set through the transceiver 130, where the first labeled spectral data set may include one or more first labeled spectral data. For example, the electronic device 100 may receive, from a spectrometer through the transceiver 130, first labeled spectral data generated by measuring a specific substance through the spectrometer.

In step S202, the pipeline recommendation module 121 selects a selected pipeline from a plurality of pipelines according to the first labeled spectral data set. Specifically, the storage medium 120 may pre-store multiple pipelines. The pipeline may be adapted for a combination of one or more workflows to be executed when implementing machine learning, where each of the workflows may be executed independently. Specifically, each of the pipelines may include a combination of one or more pre-processing procedures and a machine learning model for building a spectral model, as shown in Table 1. Table 1 is an example of pre-processing procedures of multiple pipelines pre-stored in the storage medium 120, in which each of the pipelines may include a combination of pre-processing procedures such as smoothing, wavelet transform, baseline correction, differentiation, or standardization, but the present disclosure is not limited to this.

TABLE 1

| Pipeline Number | Procedure 1 | Procedure 2 | Procedure 3 | Procedure 4 | Procedure 5 |
| --- | --- | --- | --- | --- | --- |
| #1 | smoothing | wavelet transform | baseline correction | differentiation | standardization |
| #2 | smoothing | wavelet transform | differentiation | baseline correction | standardization |
| #3 | wavelet transform | smoothing | differentiation | baseline correction | standardization |
| #4 | wavelet transform | differentiation | smoothing | baseline correction | standardization |
| #5 | wavelet transform | differentiation | baseline correction | smoothing | standardization |

In one embodiment, the pipeline recommendation module 121 searches for the best pipeline to be the selected pipeline from a plurality of pipelines according to the first labeled spectral data set based on automatic machine learning (AutoML), in which the best pipeline may include: the best combination of pre-processing procedures, the best machine learning model, and the best hyperparameter.

In step S203, the explanation module 122 determines the important wavelength range of the selected pipeline. In one embodiment, the storage medium 120 pre-stores a target wavelength range. The target wavelength range is, for example, customized by a user based on his professional knowledge.

The explanation module 122 instructs the pipeline recommendation module 121 to re-select the selected pipeline based on the important wavelength range in response to a difference greater than a threshold, and the difference is between the important wavelength range and the target wavelength range. And the explanation module 122 outputs the analysis information through the transceiver 130 in step S204 in response to a difference being less than or equal to the threshold, in which the difference is between the important wavelength range and the target wavelength range. Among the above, the analysis information may include information about the selected pipeline and the important wavelength ranges.

In one embodiment, the analysis information may indicate the composition of the selected pipeline recommended by the electronic device 100. For example, the selected pipeline includes a combination of one or more pre-processing procedures or machine learning models. The user may set the selected pipeline as the spectral model of the spectrometer, so that the spectrometer detects the composition of a specific substance more accurately (for example, the substance corresponding to the first labeled spectral data).

In one embodiment, the analysis information may indicate the important wavelength range of the specific substance (for example, the substance corresponding to the first labeled spectral data). The user may determine which wavelength range has the most significant impact on the detection result of a specific substance by referring to the important wavelength range. For example, suppose that the analysis information indicates that the important wavelength range of a specific substance (such as hydrogen-oxygen bond and/or carbon-hydrogen bond) that affects the sweetness of sugar is 1400-1500 Hz (hertz). Accordingly, in order to detect the sweetness of sugar more accurately, the user may select a spectrometer suitable for detecting substances at 1400-1500 Hz, or select a spectral model (or a pipeline) suitable for detecting substances at 1400-1500 Hz for the spectrometer.

And the explanation module 122 determines the important wavelength range of the selected pipeline according to the first measurement result. Specifically speaking, the pipeline recommendation module 121 may select one or more first labeled spectral data from the first labeled spectral data set, and generate the first measurement result corresponding to the one or more first labeled spectral data based on the one or more first labeled spectral data and the selected pipeline. The first measurement result may include spectral lines, where the spectral lines may include information of multiple wavelength ranges and multiple spectral intensities corresponding to the multiple wavelength ranges.

The explanation module 122 determines the important wavelength range corresponding to the selected pipeline according to the first measurement result. Specifically, the explanation module 122 calculates the degree of influence of each wavelength range on the spectral line in the first measurement result. If there is a specific wavelength range that has an degree of influence on the spectral line greater than the threshold, the explanation module 122 determines that the specific wavelength range is an important wavelength range. The degree of influence may be related to one of the following: correlation coefficient, mutual information, F-test results, analysis results of partial least squares method (PLS), analysis results of model-independent local interpretable model-agnostic explanations (LIME), or analysis results of SHapley additive explanations (SHAP).

Figure 3:
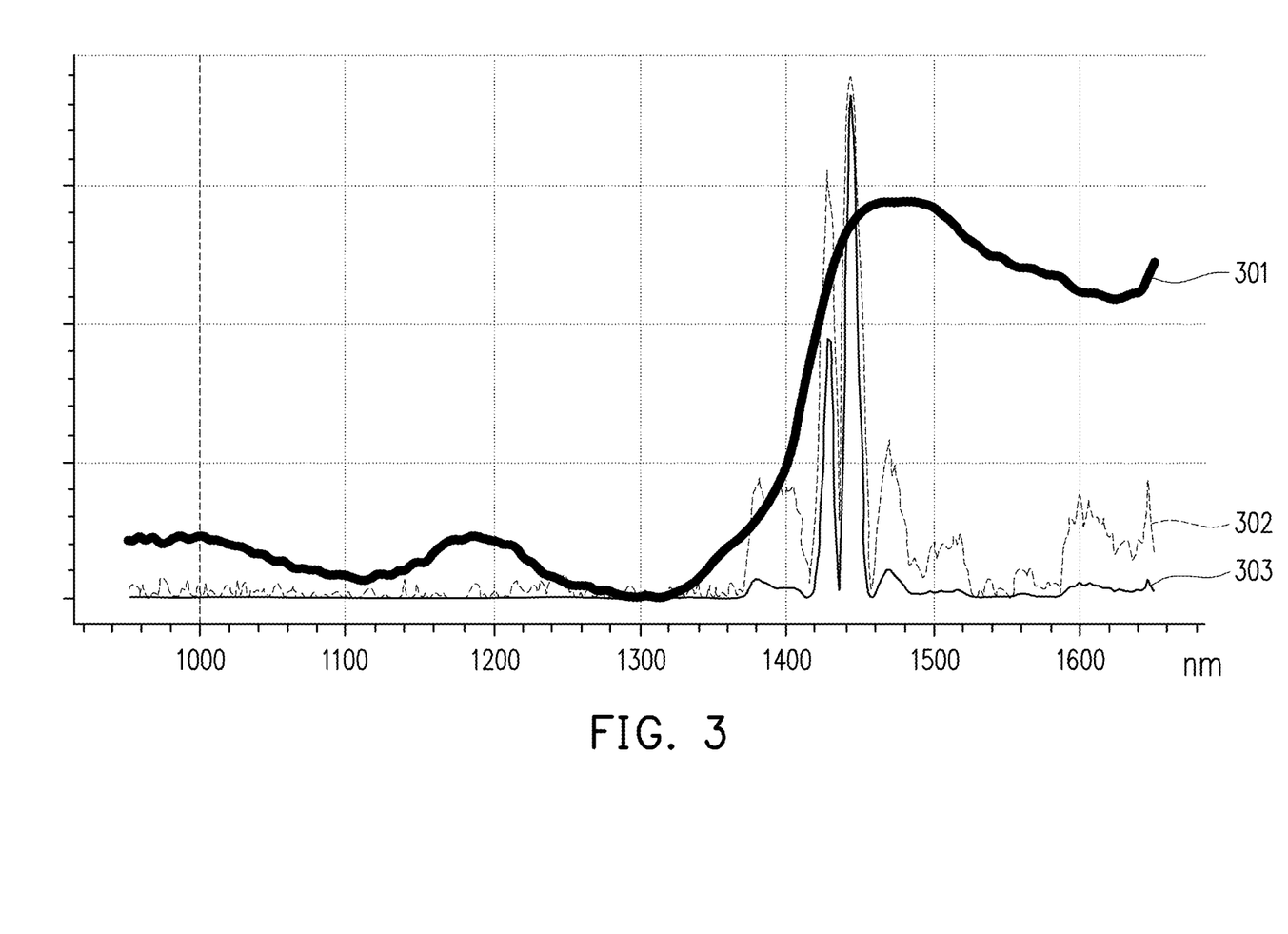
FIG. 3 is a schematic diagram of the degree of influence of different wavelength ranges on spectral lines according to an embodiment of the present disclosure.

Assuming that the label of the first labeled spectral data in the first labeled spectral data set is related to sweetness, the explanation module 122 determines the degree of influence of each wavelength range on the sweetness according to the first measurement result. FIG. 3 is a schematic diagram of the degree of influence of different wavelength ranges on spectral lines according to an embodiment of the present disclosure, in which the horizontal axis is the wavelength and the vertical axis is the degree of influence. FIG. 3 includes a curve 301 representing correlation coefficient, a curve 302 representing mutual information, and a curve 303 representing the F-test result. After the explanation module 122 generates the curve 301, the curve 302, and the curve 303 according to the spectral lines in the first measurement result, the explanation module 122 can determine the degree of influence of each wavelength range on the sweetness according to the curve 301, the curve 302, and the curve 303.

For example, it can be seen from FIG. 3 that the wavelength range between 1400 nm and 1500 nm is of most relevant to the change in sweetness. In other words, the wavelength range between 1400 nm and 1500 nm is the most suitable wavelength range for determining the sweetness of substances. Therefore, the explanation module 122 defines the wavelength range between 1400 nm and 1500 nm as an important wavelength range.

Figure 4:
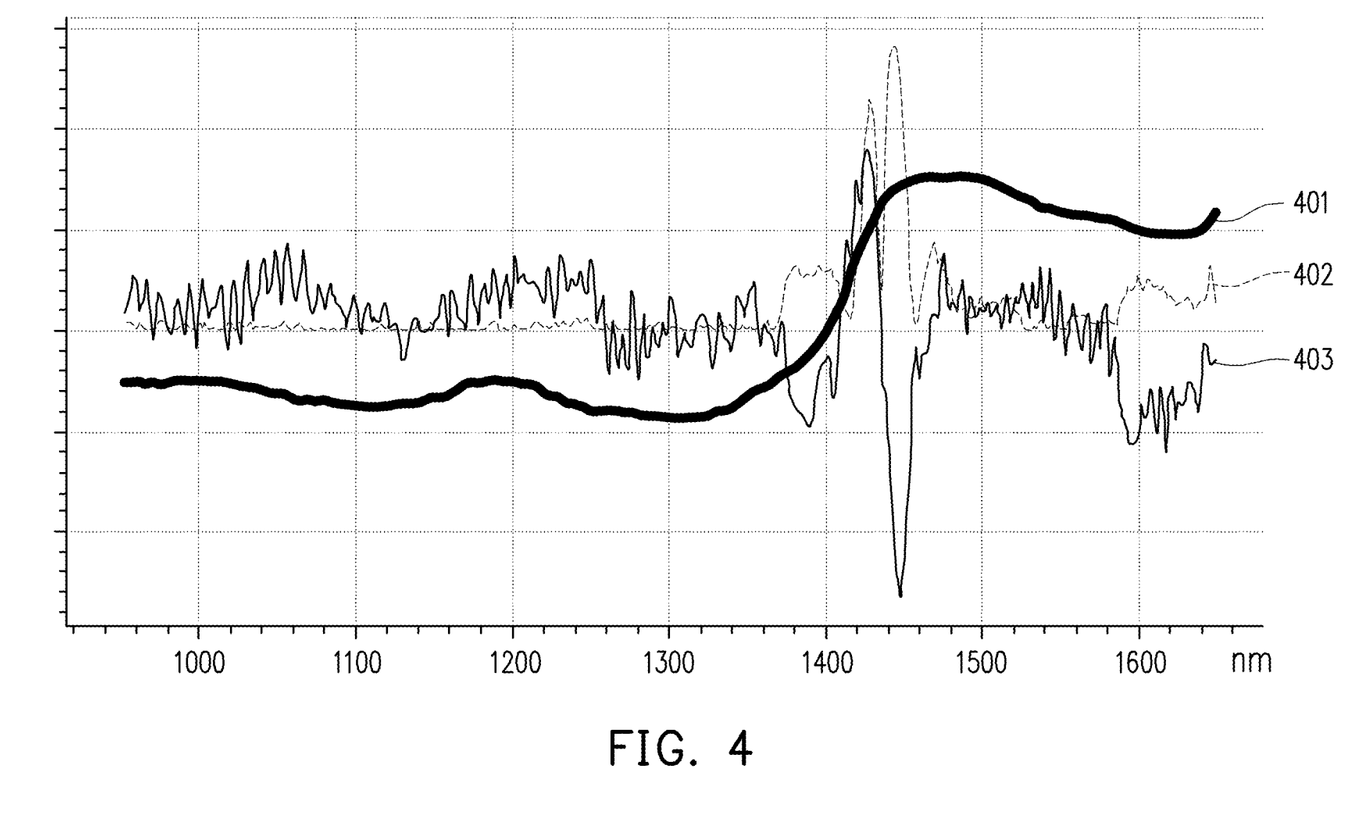
FIG. 4 is a schematic diagram of the degree of influence of different wavelength ranges on spectral lines according to another embodiment of the present disclosure.

Assuming that the label of the first labeled spectral data in the first labeled spectral data set is related to sweetness, the explanation module 122 determines the degree of influence of each wavelength range on the sweetness according to the first measurement result. FIG. 4 is a schematic diagram of the degree of influence of different wavelength ranges on spectral lines according to another embodiment of the present disclosure, in which the horizontal axis is the wavelength and the vertical axis is the degree of influence. FIG. 4 includes a curve 401 representing correlation coefficient, a curve 402 representing mutual information, and a curve 403 representing the PLS-analysis result. After the explanation module 122 generates the curve 401, the curve 402, and the curve 403 according to the spectral lines in the first measurement result, the explanation module 122 can determine the degree of influence of each wavelength range on the sweetness according to the curve 401, the curve 402, and the curve 403.

For example, it can be seen from the curve 403 of FIG. 4 that the wavelength range between 1420 nm and 1440 nm has the greatest mutual information. Accordingly, the explanation module 122 determines the wavelength range between 1420 nm and 1440 nm. Therefore, the explanation module 122 defines the wavelength range between 1420 nm and 1440 nm as an important wavelength range.

Figure 5:
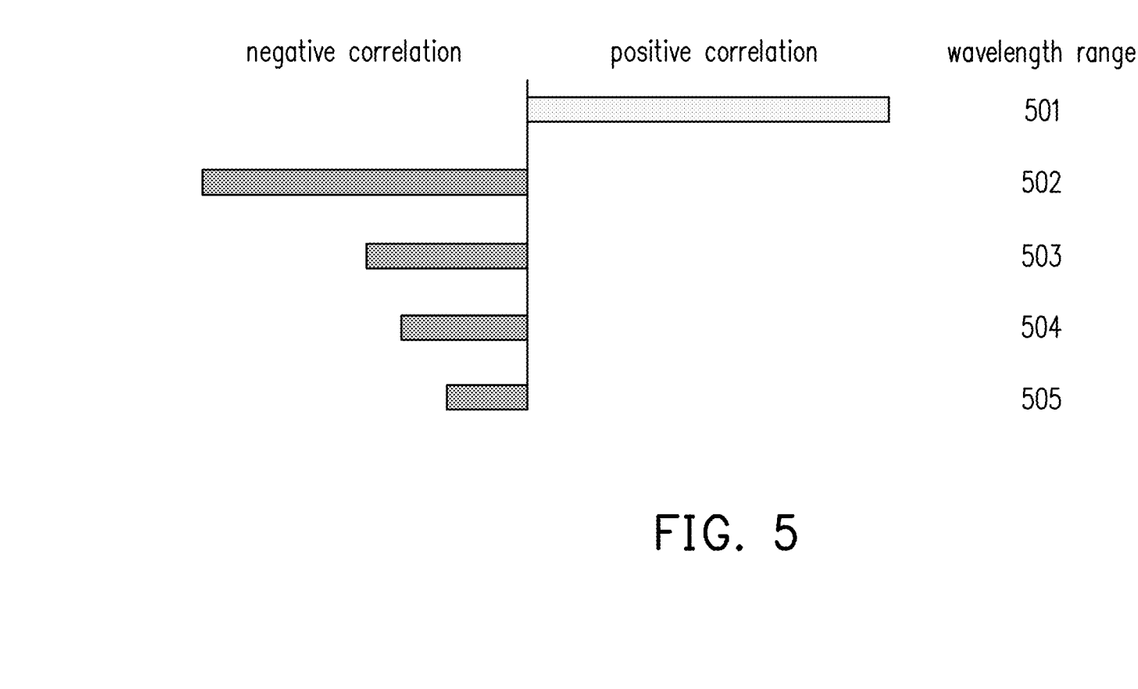
FIG. 5 is a schematic diagram of the degree of influence of different wavelength ranges on spectral lines according to yet another embodiment of the present disclosure.

Assuming that the label of the first labeled spectral data in the first labeled spectral data set is related to sweetness, the explanation module 122 determines the degree of influence of each wavelength range on the sweetness according to the first measurement result. FIG. 5 is a schematic diagram of the degree of influence of different wavelength ranges on spectral lines according to yet another embodiment of the present disclosure.

FIG. 5 includes the analysis results corresponding to the wavelength ranges 501, 502, 503, 504, and 505 generated by the explanation module 122 based on LIME. It can be seen from FIG. 5 that the wavelength range 501 has the highest absolute value of the analysis result. Accordingly, the explanation module 122 can determine that among the wavelength ranges 501, 502, 503, 504, and 505, the wavelength range 501 is the most related range to the change in sweetness. Therefore, the explanation module 122 defines the wavelength range 501 as an important wavelength range.

In one embodiment, the electronic device 100 determines the important wavelength range of the specific substance based on multiple labeled spectral data generated by measuring the specific substance through multiple different spectrometers. The important wavelength range helps the user choose the transferable wavelength range suitable for various spectrometers, and then select the spectrometer for detecting specific substances according to the transferable wavelength band. Here, the transferable wavelength range is the transferable feature. Specifically, the electronic device 100 may receive a first labeled spectral data set including one or more first labeled spectral data and a second labeled spectral data set including one or more second labeled spectral data through the transceiver, in which the first labeled spectral data set may be generated when the first spectrometer detects a specific substance, the second labeled spectral data set may be generated when the second spectrometer detects the specific substance, and the first spectrometer is different from the second spectrometer.

Then, the pipeline recommendation module 121 selects the selected pipeline from a plurality of pipelines pre-stored in the storage medium 120. After the selected pipeline is selected, the pipeline recommendation module 121 generates a first measurement result corresponding to the first labeled spectral data set and a second measurement result corresponding to the second labeled spectral data set according to the selected pipeline, in which the first measurement result and the second measurement result may respectively include spectral lines corresponding to the specific substances.

Then, the explanation module 122 determines the important wavelength range corresponding to the selected pipeline according to the first measurement result, and determines the second important wavelength range corresponding to the selected pipeline according to the second measurement result. The explanation module 122 may update the important wavelength range according to the second important wavelength range, thereby generating an updated important wavelength range. The updated important wavelength range may be a wavelength range where the original important wavelength range overlaps with the second important wavelength range. After generating the updated important wavelength range, the explanation module 122 may output analysis information including relevant information of the updated important wavelength range through the transceiver 130 for the user's reference.

In one embodiment, the storage medium 120 may pre-store a plurality of spectrometer specifications, and each spectrometer specification may include information such as the wavelength range supported by the spectrometer or the price of the spectrometer. The spectrometer recommendation module 123 may select a selected spectrometer specification from a plurality of spectrometer specifications according to the updated important wavelength range, and outputs the selected spectrometer specification through the transceiver 130. The spectrometer recommendation module 123 selects the selected spectrometer specification based on conditions such as detection accuracy or cost performance of the spectrometer, but the present disclosure is not limited thereto.

Figure 6:
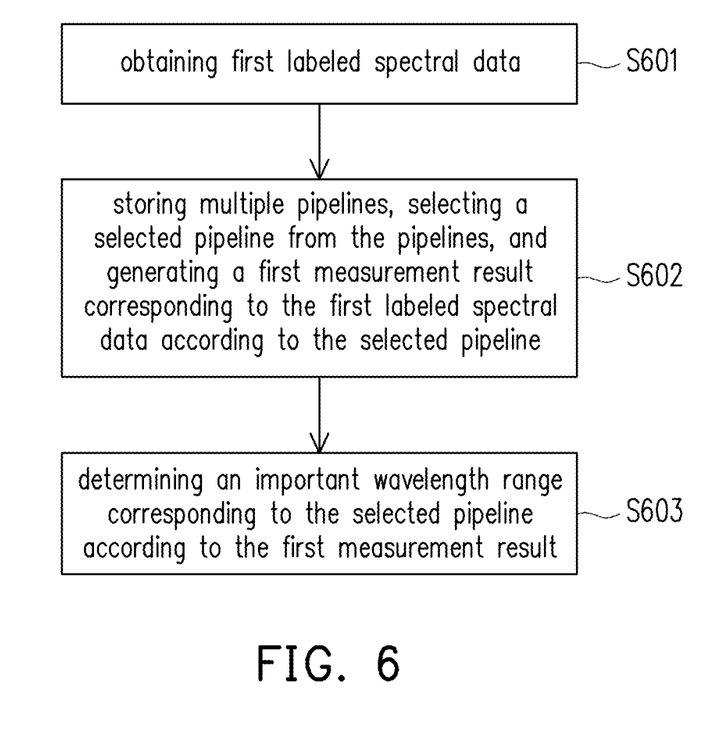
FIG. 6 is a flowchart of a method for spectral model explanation according to another embodiment of the present disclosure.

FIG. 6 is a flowchart of a method for spectral model explanation according to an embodiment of the present disclosure, and the method may be implemented through the electronic device 100 of FIG. 1. In step S601, a first labeled spectral data is obtained. In step S602, a plurality of pipelines are stored, a selected pipeline is selected from the pipelines, and a first measurement result corresponding to the first labeled spectral data is generated according to the selected pipeline. In step S603, an important wavelength range corresponding to the selected pipeline is determined according to the first measurement result.

In sum, the present disclosure obtains the important wavelength range corresponding to the specific substance based on the labeled spectral data of the specific substance. The user may interpret the spectral model according to the important wavelength range to understand how the parameters in the spectral model affect the spectral lines. The user may select the most suitable spectrometer or spectral model for detecting the specific substance according to the important wavelength range. For example, compared to a spectrometer that is suitable for a large wavelength range, the user can choose to use a spectrometer suitable for a small wavelength range that is more cost-effective, thereby reducing the cost of deploying the spectrometer. Alternatively, the user can select the transferable band suitable for multiple different spectrometers according to the important wavelength range, and then select a spectrometer with high sensitivity to the transferable band from spectrometers on the market. On the other hand, the user can also create a spectral model based on the important wavelength range. The spectral model created based on the important wavelength range has higher accuracy and lower complexity. In addition, the user may also formulate a standard operating procedure for detecting the specific substance according to the important wavelength range to optimize the detection results. For example, the user can formulate a detection procedure that increases the signal-to-noise ratio of an important wavelength range, so that the spectrometer or spectral model detects the specific substance more accurately.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An electronic device for spectral model explanation, comprising:
    a transceiver, adapted to obtain first labeled spectral data;
    a storage medium, adapted to store a plurality of modules; and
    a processor, coupled to the storage medium and the transceiver, and adapted to access and execute the modules, wherein the plurality of modules comprise:
    a pipeline recommendation module, adapted to store a plurality of pipelines, wherein the pipeline recommendation module selects a selected pipeline from the plurality of pipelines, and generates a first measurement result corresponding to the first labeled spectral data according to the selected pipeline; and
    an explanation module, adapted to determine an important wavelength range corresponding to the selected pipeline according to the first measurement result.

2. The electronic device according to claim 1, wherein the storage medium further stores a target wavelength range, wherein the explanation module instructs the pipeline recommendation module to re-select the selected pipeline in response to a difference greater than a threshold, and the difference is between the important wavelength range and the target wavelength range.

3. The electronic device according to claim 1, wherein the transceiver further obtains second labeled spectral data, wherein the pipeline recommendation module generates a second measurement result corresponding to the second labeled spectral data according to the selected pipeline, wherein the explanation module determines the second important wavelength range corresponding to the selected pipeline according to the second measurement result, and updates the important wavelength range according to the second important wavelength range to generate an updated important wavelength range.

4. The electronic device according to claim 3, wherein the updated important wavelength range is a wavelength range where the important wavelength range overlaps with the second important wavelength range.

5. The electronic device according to claim 3, wherein the first labeled spectral data and the second labeled spectral data respectively correspond to different spectrometers.

6. The electronic device according to claim 3, wherein the storage medium further stores a plurality of spectrometer specifications, and the modules further comprise:
    a spectrometer recommendation module, adapted to select a selected spectrometer specification from the spectrometer specifications according to the updated important wavelength range, and output the selected spectrometer specification through the transceiver.

7. The electronic device according to claim 1, wherein the first measurement result comprises at least one spectral line, wherein the explanation module calculates a degree of influence of a specific wavelength range on the at least one spectral line, and determines that the specific wavelength range is the important wavelength range in response to the degree of influence being greater than a threshold.

8. The electronic device according to claim 7, wherein the degree of influence is related to one of the following:
    correlation coefficient, mutual information, F-test results, analysis results of partial least squares method, analysis results of model-independent local interpretable model-agnostic explanations, or analysis results of SHapley additive explanations.

9. The electronic device according to claim 1, wherein the selected pipeline comprises a combination of at least one pre-processing procedure, and a machine learning model.

10. The electronic device according to claim 1, wherein the explanation module outputs analysis information through the transceiver, wherein the analysis information is related to the selected pipeline and the important wavelength range.

11. A method for spectral model explanation, comprising:
obtaining first labeled spectral data;
storing a plurality of pipelines, selecting a selected pipeline from the pipelines, and generating a first measurement result corresponding to the first labeled spectral data according to the selected pipeline; and
determining an important wavelength range corresponding to the selected pipeline according to the first measurement result.

12. The method according to claim 11, further comprising:
re-selecting the selected pipeline in response to a difference greater than a threshold, wherein the difference is between the important wavelength range and a target wavelength range.

13. The method according to claim 11, further comprising:
obtaining second labeled spectral data;
generating a second measurement result corresponding to the second labeled spectral data according to the selected pipeline; and
determining a second important wavelength range corresponding to the selected pipeline according to the second measurement result; and
updating the important wavelength range according to the second important wavelength range and generating an updated important wavelength range.

14. The method according to claim 13, wherein the updated important wavelength range is a wavelength range where the important wavelength range overlaps with the second important wavelength range.

15. The method according to claim 13, wherein the first labeled spectral data and the second labeled spectral data respectively correspond to different spectrometers.

16. The method according to claim 13, further comprising:
selecting a selected spectrometer specification from a plurality of spectrometer specifications according to the updated important wavelength range, and outputting the selected spectrometer specification.

17. The electronic device according to claim 11, wherein the first measurement result comprises at least one spectral line, and determining the important wavelength range corresponding to the selected pipeline according to the first measurement result comprises:
calculating a degree of influence of a specific wavelength range on the at least one spectral line; and
determining that the specific wavelength range is the important wavelength range in response to the degree of influence being greater than a threshold.

18. The method according to claim 17, wherein the degree of influence is related to one of the following:
correlation coefficient, mutual information, F-test results, analysis results of partial least squares method, analysis results of model-independent local interpretable model-agnostic explanations, or analysis results of SHapley additive explanations.

19. The method according to claim 11, wherein the selected pipeline comprises a combination of at least one pre-processing procedure, and a machine learning model.

20. The method according to claim 11, further comprising:
outputting analysis information, wherein the analysis information is related to the selected pipeline and the important wavelength range.

* * * * *